Dec. 26, 1922.
N. S. SCHAFFER.
NOZZLE.
FILED OCT. 7, 1920.
1,439,763
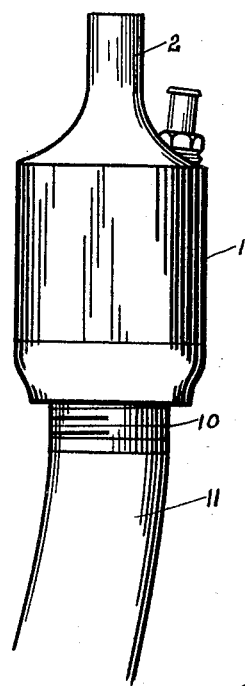
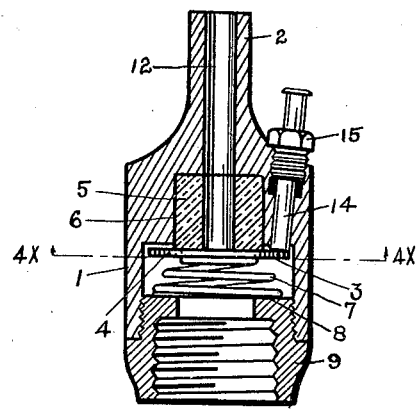
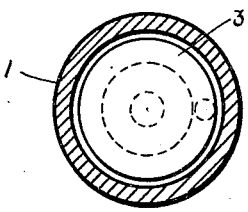
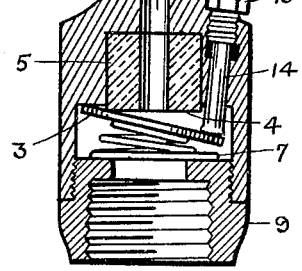
INVENTOR.
Noah S. Schaffer
BY Frank Keipes.
ATTORNEY.

Patented Dec. 26, 1922.

1,439,763

UNITED STATES PATENT OFFICE.

NOAH SEBASTIAN SCHAFFER, OF ROCHESTER, NEW YORK.

NOZZLE.

Application filed October 7, 1920. Serial No. 415,419.

*To all whom it may concern:*

Be it known that I, NOAH S. SCHAFFER, a citizen of the United States, residing at Rochester, in the county of Monroe and State of New York, have invented certain new and useful Improvements in Nozzles, of which the following is a specification.

The object of this invention is to provide a new and improved nozzle which is adapted to automatically shut off the water on the release thereof by the operator.

This and other objects of this invention will be fully illustrated in the drawing, described in the specification and pointed out in the claims at the end thereof.

In the accompanying drawing:

Fig. 1 is a side elevation of the nozzle as at appears when attached to the end of a hose.

Fig. 2 is a vertical sectional view of the nozzle showing the valve therein in its closed position.

Fig. 3 is a similar sectional view of the nozzle with the valve therein in its open position.

Fig. 4 is a horizontal sectional view of the nozzle, the section being taken on the line 4ˣ—4ˣ of Fig. 2.

In the several figures of the drawing, like reference numerals indicate like parts.

The nozzle forming the subject of this invention comprises the cylindrical housing 1 which has the extension 2 of greatly reduced diameter formed integral therewith on the outer end thereof. The inside of the housing has a valve therein which is made up of the valve disc 3 and the valve seat 4. The valve seat 4 is formed by the end of the rubber cylinder 5 which is mounted in the pocket 6, forming part of the inside of the housing. The spiral spring 7 normally forces the valve disc 3 onto its seat in order to keep the valve closed. This spring rests on the shoulder 8 provided on the threaded sleeve 9 threaded into the lower end of the housing. This sleeve is provided with a female thread into which the nipple 10 carried on the end of the hose 11 is screwed to connect the nozzle to the hose.

Leading from the rubber cylinder 5 is the duct 12 which passes thru the extension 2 of the housing and forms the nozzle proper of the device. In the housing 1 at one side of the extension 2 is mounted approximately parallel to the periphery thereof, the valve stem 14. This stem passes thru the stuffing box 15 which is threaded into the housing to prevent leakage thru the opening in the housing in which the stem 14 is mounted to slide. The lower end of the stem 14 rests against the face of the disc and is normally held thereby in the position shown in Fig. 2, in which the stem is held to project its maximum distance out of the housing. When the stem is depressed from this position into the position shown in Fig. 3, the valve disc 3 is tilted from the seat 4 and the valve is thus opened to permit the water to pass therethru and out thru the duct 12. On the release of the valve stem 14, the coil spring 7 expands and in so doing reseats the valve and closes it.

From the foregoing it will be seen that should the operator drop the nozzle the water will be automatically shut off by the action of the valve in the nozzle which operates to reseat itself because the operator permits the stem 14 to retain its normal position by releasing the stem, so that the coil spring can force the valve disc back onto its seat.

I claim:

1. In a nozzle, the combination of a housing, a resilient valve seat provided in said housing, a valve disc yieldingly held against said resilient valve seat, a valve stem mounted on one side of said housing and resting against said valve disc adjacent its periphery, said valve stem being adapted to tilt said valve disc from said seat to allow the passage of water thru said nozzle.

2. In a nozzle, the combination of a housing, an extension formed at the end of said housing, whereby a shoulder is formed between said housing and said extension, a valve stem adapted to project thru said shoulder into one side of said housing, a valve disc mounted in said housing and normally seated, said valve stem being adapted to rest on said valve disc so as to tilt said valve disc from its seat on the inward movement thereof.

3. In a nozzle, the combination of a housing, a rubber cylinder mounted in said housing, the inner end of said cylinder forming a valve seat, a valve disc normally held against said seat, and a valve stem resting on said valve disc, a duct leading from said rubber cylinder and through the housing, said valve stem being adapted to unseat said valve disc to permit the liquid to flow past said valve disc into said duct.

In testimony whereof I affix my signature.

NOAH SEBASTIAN SCHAFFER.